(12) United States Patent
Coolidge (10) Patent No.: US 9,810,334 B2
(45) Date of Patent: Nov. 7, 2017

(54) PRESSURE LIMITED FLOW PRIORITY BOOST

(71) Applicant: Parker-Hannifin Corporation, Cleveland, OH (US)

(72) Inventor: Gregory T. Coolidge, Eylria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 62 days.

(21) Appl. No.: 14/765,139

(22) PCT Filed: Jan. 31, 2014

(86) PCT No.: PCT/US2014/014167
§ 371 (c)(1),
(2) Date: Jul. 31, 2015

(87) PCT Pub. No.: WO2014/121081
PCT Pub. Date: Aug. 7, 2014

(65) Prior Publication Data
US 2015/0362087 A1     Dec. 17, 2015

Related U.S. Application Data

(60) Provisional application No. 61/759,333, filed on Jan. 1, 2013.

(51) Int. Cl.
  *F15B 11/042*     (2006.01)
  *F16K 17/18*     (2006.01)
  (Continued)

(52) U.S. Cl.
  CPC ............ *F16K 17/18* (2013.01); *F15B 11/042* (2013.01); *F15B 13/0418* (2013.01);
  (Continued)

(58) Field of Classification Search
  CPC ........................... F15B 11/042; F15B 13/0418
  (Continued)

(56) References Cited

U.S. PATENT DOCUMENTS 3,985,153 A   10/1976  Thomas
4,958,553 A *  9/1990  Ueno ...................... F15B 13/01
                                            137/596.15

(Continued)

FOREIGN PATENT DOCUMENTS

DE         198 31 595        1/2000
DE    10 2006 012 030        9/2007
(Continued)

OTHER PUBLICATIONS

Human translation of Weickert, EP 1279870, Jan. 29, 2003.*
(Continued)

*Primary Examiner* — Michael R Reid
*Assistant Examiner* — Paul J Gray
(74) *Attorney, Agent, or Firm* — McDonnell Boehnen Hulbert & Berghoff LLP (57) ABSTRACT

A hydraulic valve assembly includes an inlet; an outlet; a pressure compensator upstream of the inlet; and a pressure limited flow priority boost valve spool movable between a first position and a second position and comprising an outer spool body and an inner spool body. The outer spool body includes deadhead meter notches disposed such that, in the first position, the spool closes fluid communication between the inlet and the pressure compensator, and such that, in the second position, the spool opens fluid communication between the inlet and the pressure compensator. The inner spool body is movable relative to the outer spool body and is configured to open fluid communication between the inlet (Continued)

and the outlet so as to bypass the compensator. The flow between the inlet and the compensator is a reduced pilot flow.

15 Claims, 12 Drawing Sheets

(51) Int. Cl.
  *F15B 13/04* (2006.01)
  *F16K 3/02* (2006.01)
  *F16K 31/12* (2006.01)
(52) U.S. Cl.
  CPC .............. *F16K 3/029* (2013.01); *F16K 31/12* (2013.01); *Y10T 137/7838* (2015.04)
(58) Field of Classification Search
  USPC .................... 137/102, 596.2, 596.14, 596.18
  See application file for complete search history.

(56) References Cited

U.S. PATENT DOCUMENTS

| | | | |
|---|---|---|---|
| 5,752,384 A | 5/1998 | Schmitt et al. | |
| 2008/0000535 A1* | 1/2008 | Coolidge | F15B 13/0417 137/625.69 |
| 2009/0217983 A1 | 9/2009 | Kauss et al. | |
| 2009/0266070 A1 | 10/2009 | Pack et al. | |
| 2011/0285197 A1 | 11/2011 | Ganzel | |

FOREIGN PATENT DOCUMENTS

| | | |
|---|---|---|
| DE | 10 2009 021 831 | 11/2010 |
| EP | 0 056 024 | 7/1982 |
| EP | 0 200 386 | 11/1986 |
| EP | 0 624 732 | 11/1994 |
| EP | 1 279 870 | 1/2003 |
| EP | 2 184 495 | 5/2010 |
| WO | 2011/115647 | 9/2011 |

OTHER PUBLICATIONS

International Search Report and Written Opinion for corresponding Patent Application No. PCT/US2014/014167 dated Jun. 12, 2014.
Written Opinion for corresponding Patent Application No. PCT/US2014/014167 dated Mar. 26, 2015.
International Preliminary Report on Patentability for corresponding Patent Application No. PCT/US2014/014167 dated May 21, 2015.

* cited by examiner

PRESSURE LIMITED FLOW PRIORITY BOOST

RELATED APPLICATIONS

This application is a national phase of International Application No. PCT/US2014/014167 filed on Jan. 31, 2014 and published in the English language, which claims the benefit of U.S. Provisional Application No. 61/759,333 filed Jan. 1, 2013, which hereby incorporated herein by reference.

FIELD OF INVENTION

The present invention relates generally to pressure limitation, and more particularly to a valve spool that provides workport priority flow and limits workport pressure during maximum pressure situations.

BACKGROUND

In order to protect hydraulic devices connected at a work port, typically a pressure relief valve is placed in parallel with the workport. The pressure relief valve typically partially or totally exhausts to tank flow going to the workport during pressure limitation. During a deadheaded workport condition, the device consumes all and potentially significant hydraulic system flow going to the workport (typically between 5.0 gpm and the valve rated pump flow, such as 32 gpm) and not used by the hydraulic device while limiting workport pressure. This pressure relief valve may also protect the workport by relieving shock pressures entering the workport. It is commonly used in Load Sense, Post Compensated, Pre Compensated, Open Center, and Closed Center control valves.

SUMMARY OF INVENTION

The flow vented by the pressure relief valve cannot be beneficially used by other system functions and creates heat which results in poor energy efficiency. Therefore, described herein is a pressure limited flow spool that limits the amount of flow consumed by a workport section during a deadheaded workport condition. Further, the flow spool includes a priority boost which takes flow directly from the pump supply flow to the workport, bypassing, for example, a pressure compensator.

According to one aspect of the invention, a hydraulic valve assembly includes an inlet; an outlet; a pressure compensator upstream of the inlet; and a pressure limited flow priority boost valve spool movable between a first position and a second position and comprising an outer spool body and an inner spool body. The outer spool body includes deadhead meter notches disposed such that, in the first position, the spool closes fluid communication between the inlet and the pressure compensator, and such that, in the second position, the spool opens fluid communication between the inlet and the pressure compensator. The inner spool body is movable relative to the outer spool body and is configured to open fluid communication between the inlet and the outlet so as to bypass the compensator. The flow between the inlet and the compensator is a reduced pilot flow.

It is possible that a worksection could be configured with the priority boost functionality at workport "A" only, at workport "B" only, or at both "A" and "B".

The foregoing and other features of the invention are hereinafter described in greater detail with reference to the accompanying drawings.

DETAILED DESCRIPTION

Other pressure relief methods are described below in comparison to exemplary pressure limited flow spools with priority boost (PLQ PRIORITY BOOST) which are detailed herein.

Traditional "System Load Sense Relief Valve"

A traditional system load sense relief valve is a device which is in parallel with the maximum load sense pressure signal. If a workport becomes deadheaded, then the workport pressure will be limited to the maximum system pressure dictated by the System Load Sense Relief Valve. This relief valve typically consumes only 0.75-1.00 gpm flow. It is commonly used in load sense, post pressure compensated, and pre pressure compensated control valves.

If a system load sense relief valve regulates pressure at a deadheaded workport, then other functions will work at maximum system pressure expending unnecessary energy. In contrast, an exemplary PLQ PRIORITY BOOST worksection regulates pressure at a deadheaded workport at a value less than maximum system pressure. Since the PLQ PRIORITY BOOST worksection and other functions can operate at a lower pressure value, energy efficiency is improved.

"Pre Pressure Compensated Control Valve with Pressure Limiter or Feed Reducer" Option This device reduces pump output pressure to a preset value that is less than the maximum hydraulic system pressure. It works with a pre load sensing pressure reducing type compensator to regulate workport pressure. Workport flow is the amount required to maintain the preset pressure value. A pre pressure compensated valve will automatically assume a conserving low (pilot) quiescent flow pressure limiting state if an actuator stalls. It will automatically convert from a pressure limiting state to outputting a flow in the range of pilot to the flow demanded by the control spool to create the pressure limiter pressure setting or if workport flow resistance is less than the pressure setting. These devices do not protect against shock pressures entering the workport so full flow or clipper pressure relief valves must be used. It is commonly used in pre pressure compensated control valves. It is noted that a pre pressure compensated valve does not have flow sharing capability.

Exemplary PLQ PRIORITY BOOST worksections can pressure limit similar to a pre pressure compensated valve. Exemplary worksections have flow sharing capability during pump flow overdemand whereas the workport flow output of pre pressure compensated valve could stop if the workport pressure is the highest or one of the highest in the hydraulic system. Exemplary systems are different because high "Inlet Flow" is extracted directly from the pump supply passage to give priority over other worksections in parallel with the priority boost worksection.

Flow Sharing Post Pressure Compensated Control Valve with Pressure Limitation Options Flow sharing post pressure compensated control valves also have a pressure limited flow (PLQ) feature that is patent pending per PCT/US2010/057555 and WO 2011/115647 A1, the disclosure of which is hereby incorporated herein in its entirety. PLQ will limit workport pressure to a preset value less than the maximum hydraulic system pressure using only pilot flow without negatively consuming system flow, causing heat generation, and wasting energy. It will automatically convert from a pressure limiting state to outputting a flow in the range of pilot to the flow demanded by the control spool to create the pressure limiter pressure setting if workport flow resistance is less than the pressure setting. A PLQ worksection can pressure limit similar to a pre pressure compensated valve. Applications that require a constant force or torque can use PLQ.

Exemplary PLQ PRIORITY BOOST worksections can pressure limit similar to a PLQ valve. Both devices have flow sharing capability during pump flow overdemand. PRIORITY BOOST is different because high "Inlet Flow" is extracted directly from the pump supply passage to give priority over other worksections in parallel with the priority boost worksection.

A flow sharing post pressure compensated control valve can be configured with a 4 GPM maximum flow catalog control spool used with the standard workport relief valve. The 4 GPM spool is selected since that is the lowest maximum workport output flow. If the workport is deadheaded then the workport relief valve will exhaust the 4 GPM during pressure limitation.

However, 4 GPM may still be wasteful during pressure limitation and may not be adequate as maximum workport output flow when the worksection is metered. An exemplary PLQ PRIORITY BOOST worksection can pressure limit similar to a pre pressure compensated valve. It has flow sharing capability during pump flow overdemand. Exemplary PRIORITY BOOST systems are different because high "Inlet Flow" is extracted directly from the pump supply passage to give priority over other worksections in parallel with the Priority Boost worksection. Any time the pressure setting is achieved or when the actuator is stalled, the control spool demands only a reduced pilot flow (e.g., 0.9 gpm) for pressure limitation. Workport output flow will automatically increase if workport pressure is less than the pressure setting.

PLQ Priority Boost

Figure 1:
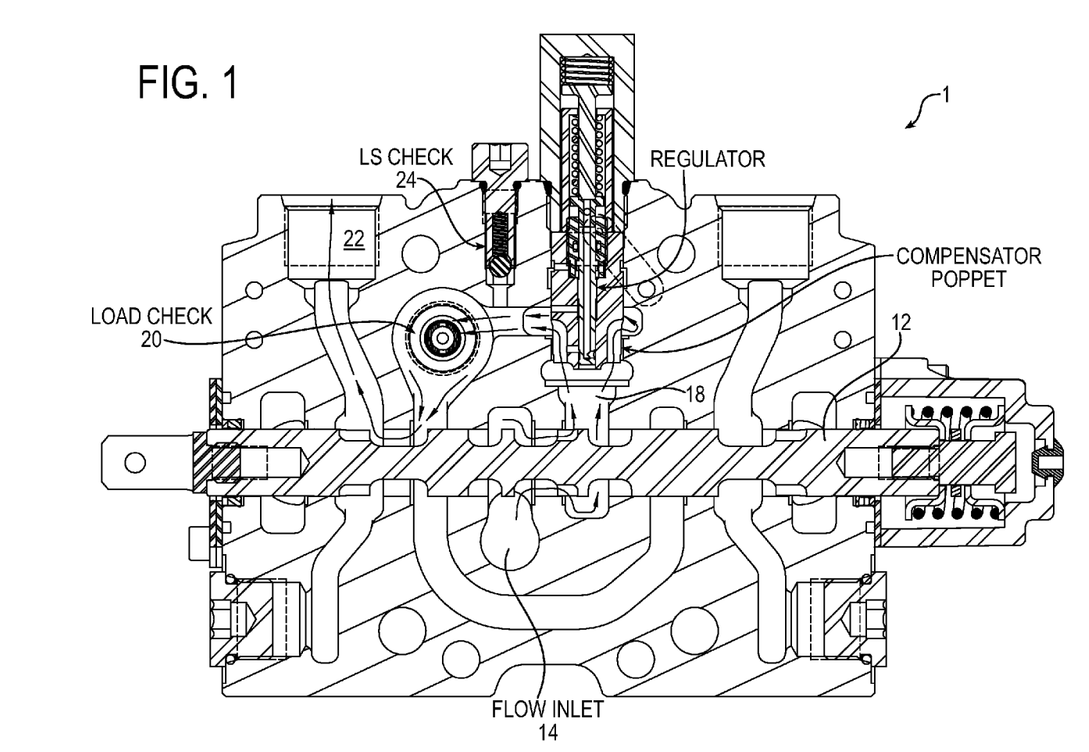
FIG. 1 shows a Flow Sharing Post Pressure Compensated Valve Worksection depicting the basic components and flow path for a PLQ Worksection.

Initially referring to FIG. 1, the illustrated valve assembly 1 shows basic valve components and flow paths in a post-compensator arrangement.

The main control spool 12 is shown shifted to the right from a neutral or closed position. Hydraulic fluid flows from the inlet passage 14, across the spool to the pressure compensator poppet 16. The pressure compensator poppet is forced to shift upward. Fluid flows across the compensator poppet into the Qreg core 18 (cast passage) to the load check 20. Load check poppet is forced open and flow progresses down across the spool and up to Workport "A" 22. Flow volume is dictated by the control spool Inlet to Qmet area that is bounded by the pressure differential of Pin-Pqm. Qmet area is located in the flow path between the spool and compensator. Workport (Pwk) and Qreg (Pqr) pressures are a function of the resistance to flow at Workport "A". Pqr pressure is sensed by the Load Sense (LS) Check 24. The LS Check system resolves the Pqr pressures of multiple worksections into the maximum Qreg pressure (Pqr max) which is also the conventional Maximum LS pressure. Pqr max pressure is sent to the "load sensing flow and margin pressure source" (LS pump or fixed pump plus bypass compensator) and individual worksection post pressure compensator spring chambers. Pqr max pressure acting on a compensator poppet causes it to resist and compensate flow in the traditional flow sharing post compensation manner. Qreg=(regulated flow & pressure downstream of compensator: "Q"=flow, "reg"=regulated). Qmet=(metered flow & pressure upstream of compensator: "Q"=flow, "met"=metered).

Figure 2:
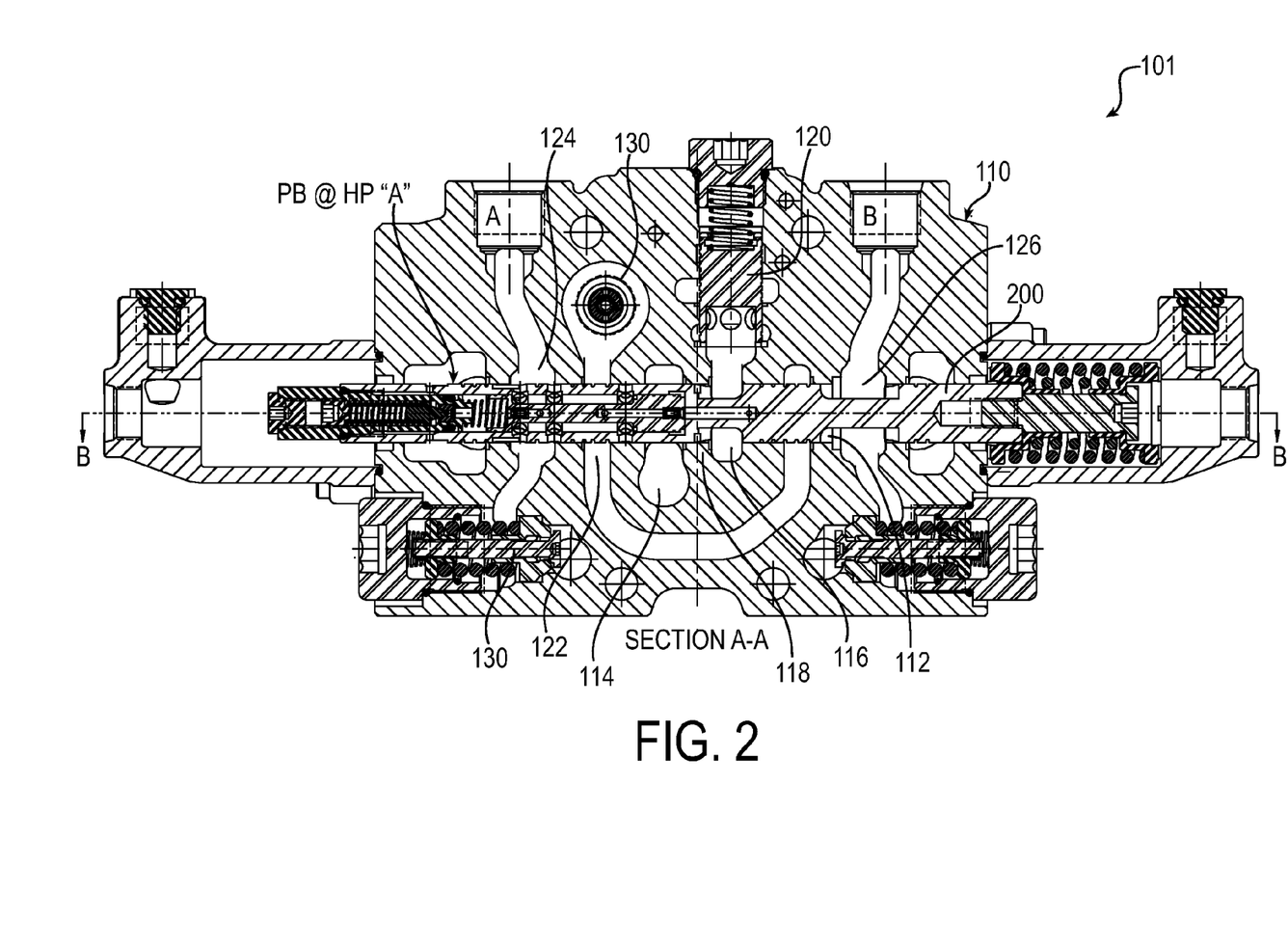
FIG. 2 shows an exemplary PLQ PRIORITY BOOST worksection including PLQ PRIORITY BOOST system components.

An exemplary PLQ PRIORITY BOOST 101 is a worksection pressure limiting system. System components may include the worksection control spool 200, flow sharing post pressure compensator 120, and workport relief valve 130 (RV). Referring to FIG. 2, a PLQ PRIORITY BOOST control spool has PLQ PRIORITY BOOST functionality at "A" with standard configuration at the "B" position.

The valve housing/body 110 may have an inlet fluid chamber 114 separated from a fluid metering fluid chamber 116 by a dividing portion 118. The chambers may be fluidly connectable to each other via the bore 112.

The spool 200 forms with the dividing portion 118 a fluid passageway fluidly connecting the inlet chamber with the fluid metering chamber.

A feed chamber 122 is fluidly connected between the metering chamber and the spool bore. A pressure compensator 120 may be connected between the metering chamber and the feed chamber. The feed chamber may be fluidly connected to A and B workport chambers 124, 126 via the spool bore. The workport chambers are fluidly connected between respective workports and the spool bore.

The spool 200 disposed in the spool bore is moveable from a neutral position where fluid communication with the spool bore is closed, and a workport A position. In this position, the inlet chamber is fluidly connected to the metering chamber and the inlet is fluidly connected to the workport chamber via a metering chamber bypass if a pressure at the workport is below a predetermined value and disconnected from the workport chamber via the metering chamber bypass if the pressure at the workport is above a predetermined value.

In exemplary embodiments, this bypass is a longitudinal fluid passage through the spool 200.

Figure 3:
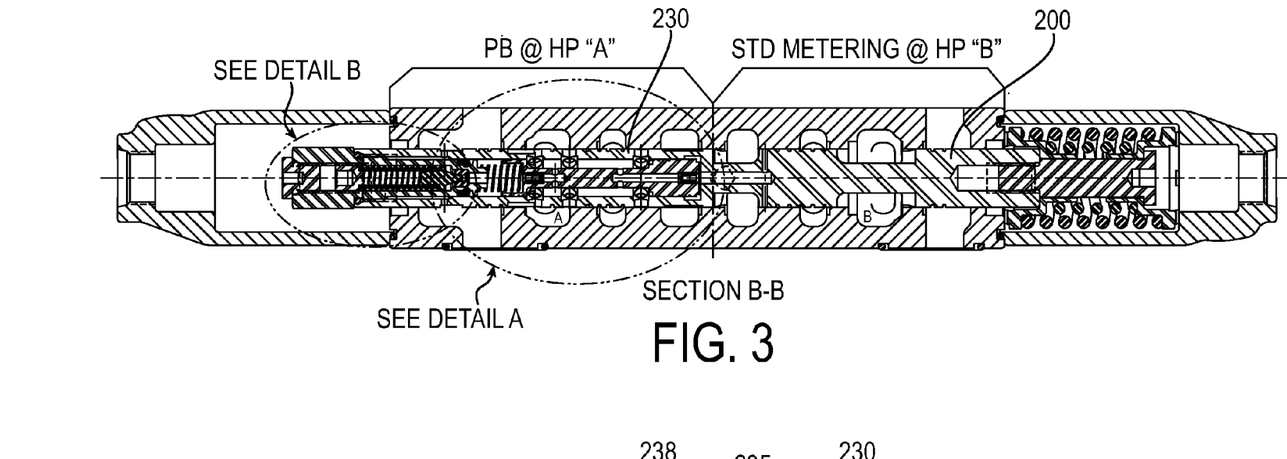
FIG. 3 shows a cross section of an exemplary PLQ PRIORITY BOOST spool.
Figure 4:
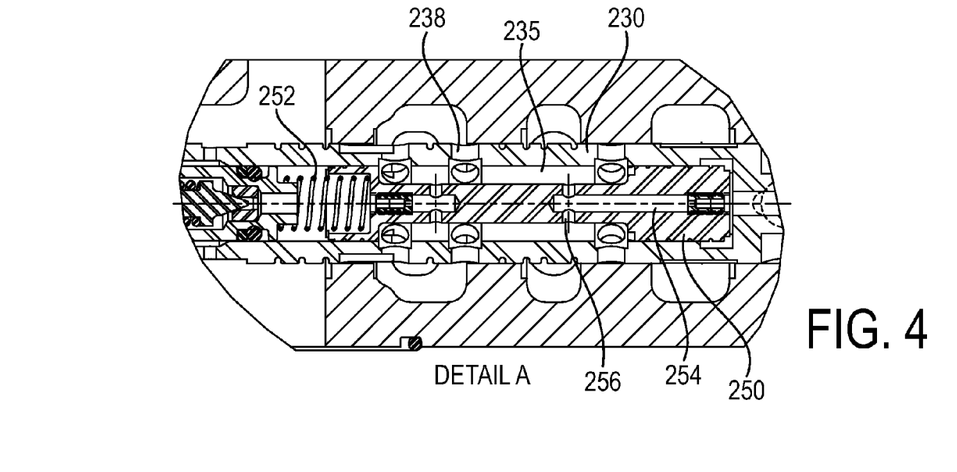
FIG. 4 shows a partial cross-sectional view of an exemplary PLQ PRIORITY BOOST spool.
Figure 5:
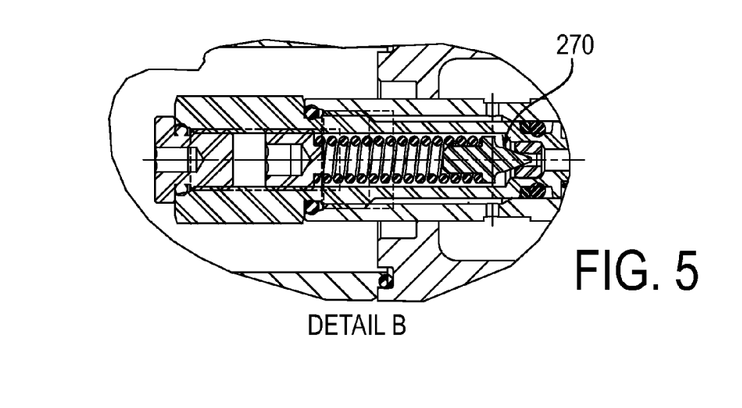
FIG. 5 shows another partial cross-sectional view of an exemplary PLQ PRIORITY BOOST spool.

Referring now to FIGS. 3-5, the spool 200 may include an outer spool body 230 having first and second longitudinal sides, for example left and right sides or A and B sides. The left or A side includes a longitudinal bore 235 and at least one radial bore 238 in fluid communication with the longitudinal bore. When the spool 200 is in the A position, a radial bore 238 is aligned with the inlet chamber and a second radial bore is aligned with the workport chamber, thereby providing fluid communication between the inlet and the workport and creating a bypass of the metering chamber.

An inner spool body 250 (or boost spool) is disposed in the longitudinal bore 235 and is axially movable with respect to the outer spool body. The inner spool body may be biased toward the second or B side, by, for example a spring 252. The inner spool body includes at least one longitudinal bore 254 and at least one radial bore 256 in fluid communication with the longitudinal bore 235 of the inner spool body and the radial bore of the outer spool body.

Exemplary inner spools may include a second set of fluidly connected bores on a side opposite the first. Each set may be in fluid communication with respective ends of the inner spool body. This fluid communication may be via an orifice to control the pressure drop thereat. In this way, the inner valve spool may be configured to provide a priority boost flow when workport pressure is below a predetermined value, and be closed when the workport pressure is above the predetermined value.

The valve spool 200 may also include a pilot relief valve 270 disposed at a first end of the outer spool body 230. The relief valve 270 may be in fluid communication with the longitudinal bore of the outer spool body and vent fluid therefrom when the pressure is higher than a predetermined threshold.

The outer spool body 230 may include deadhead meter notches on a radially outward and longitudinally central portion for providing a load sense signal and a reduced pilot flow when in the A position. These notches may be, for example, smaller than recesses on the B side of the spool. Therefore, when in the A position, the outer spool provides a pilot flow to workport A. In contrast, when in the B position, the outer spool may provide a normal/maximum flow to workport B.

Figure 6:
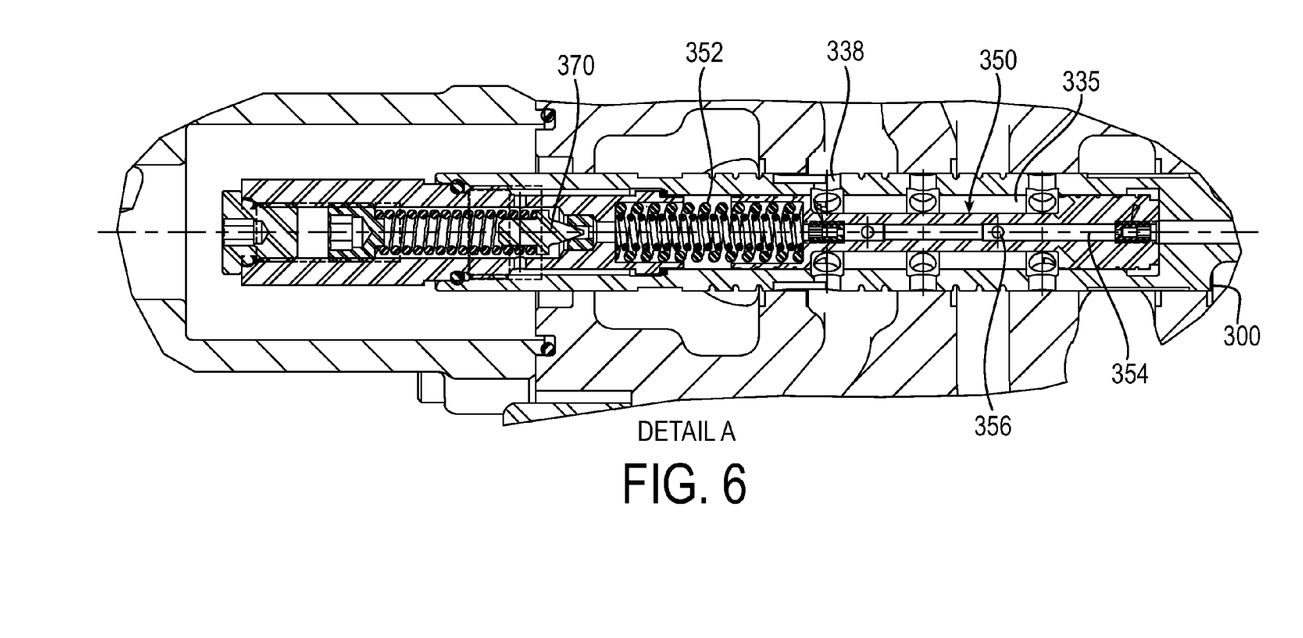
FIG. 6 shows a partial cross-sectional view of another exemplary PLQ PRIORITY BOOST spool.

Turning now to FIG. 6, an exemplary embodiment of the spool is shown at 300. The spool 300 is substantially the same as the above-referenced spool 200, and consequently the same reference numerals but indexed by 100 are used to denote structures corresponding to similar structures in the spool. In addition, the foregoing description of the spool 200 is equally applicable to the spool 300. Moreover, it will be appreciated upon reading and understanding the specification that aspects of the spools may be substituted for one another or used in conjunction with one another where applicable.

Figure 7:
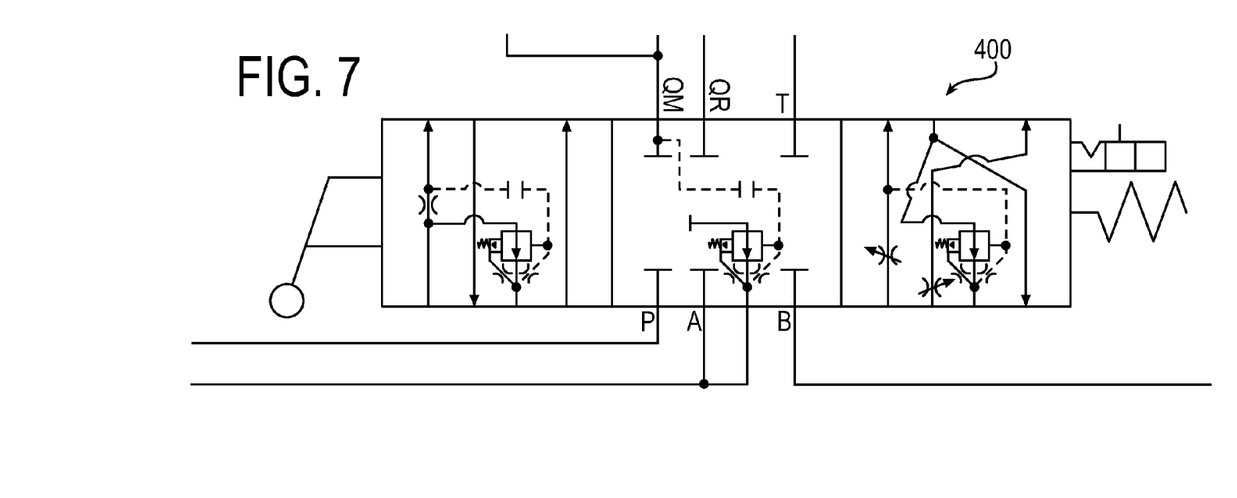
FIG. 7 shows a schematic diagram of an exemplary PLQ PRIORITY BOOST spool with connections.

Turning now to FIG. 7, a schematic of an exemplary spool is show at 400. The spool 400 is substantially the same as the above-referenced spools 200 and 300, and consequently the same reference numerals but indexed by 100 are used to denote structures corresponding to similar structures in the spool. In addition, the foregoing description of the spools 200 and 300 are equally applicable to the spool 400. Moreover, it will be appreciated upon reading and understanding the specification that aspects of the spools may be substituted for one another or used in conjunction with one another where applicable.

The flow sharing post pressure compensator design is capable of regulating the pilot flow. Workport shock pressure dissipation and lower pilot flow meterability are attributes of the relief valve design. When fully actuated, an exemplary PLQ PRIORITY BOOST system will limit workport pressure to a preset value less than the maximum hydraulic system pressure using only pilot flow without negatively consuming system flow, causing heat generation, and wasting energy. An application that requires a constant force or torque such as a clamp can use exemplary PLQ PRIORITY BOOST systems. Exemplary embodiments give load sense and flow sharing post pressure compensated control valves a feature to compete with a pre pressure compensated valve device. Priority boost completes the work task immediately so that other functions can then work without any flow sharing effect from the priority boost worksection.

Exemplary embodiments are well suited when the actuator retracted-to-stalled transition distance is longer. See, e.g., the hydraulic cylinder and clamp example of FIGS. 8-10. Priority boost will pressure limit the workport if the pressure setting is achieved during machine actuator transition or when it stalls. A customer selected control spool "Inlet Flow" will be the workport output higher flow as the actuator (cylinder) extends from a retracted to a stalled state. The "Inlet (Boost) Flow" is extracted directly from the pump supply passage to give priority over other worksections in parallel with the priority boost worksection. For example, a function can be rapidly advanced, and clamped. Any time the pressure setting is achieved or when the actuator is stalled, the control spool demands only a reduced (e.g., 0.9 gpm) pilot flow for pressure limitation. Workport output flow will automatically increase if workport pressure is less than the pressure setting. The selected inlet flow value can vary (for example, 4-32 gpm, resulting in a ratio of maximum flow to pilot flow of between about 4:1 to about 36:1, although other flow ratios are possible.).

Figure 11:
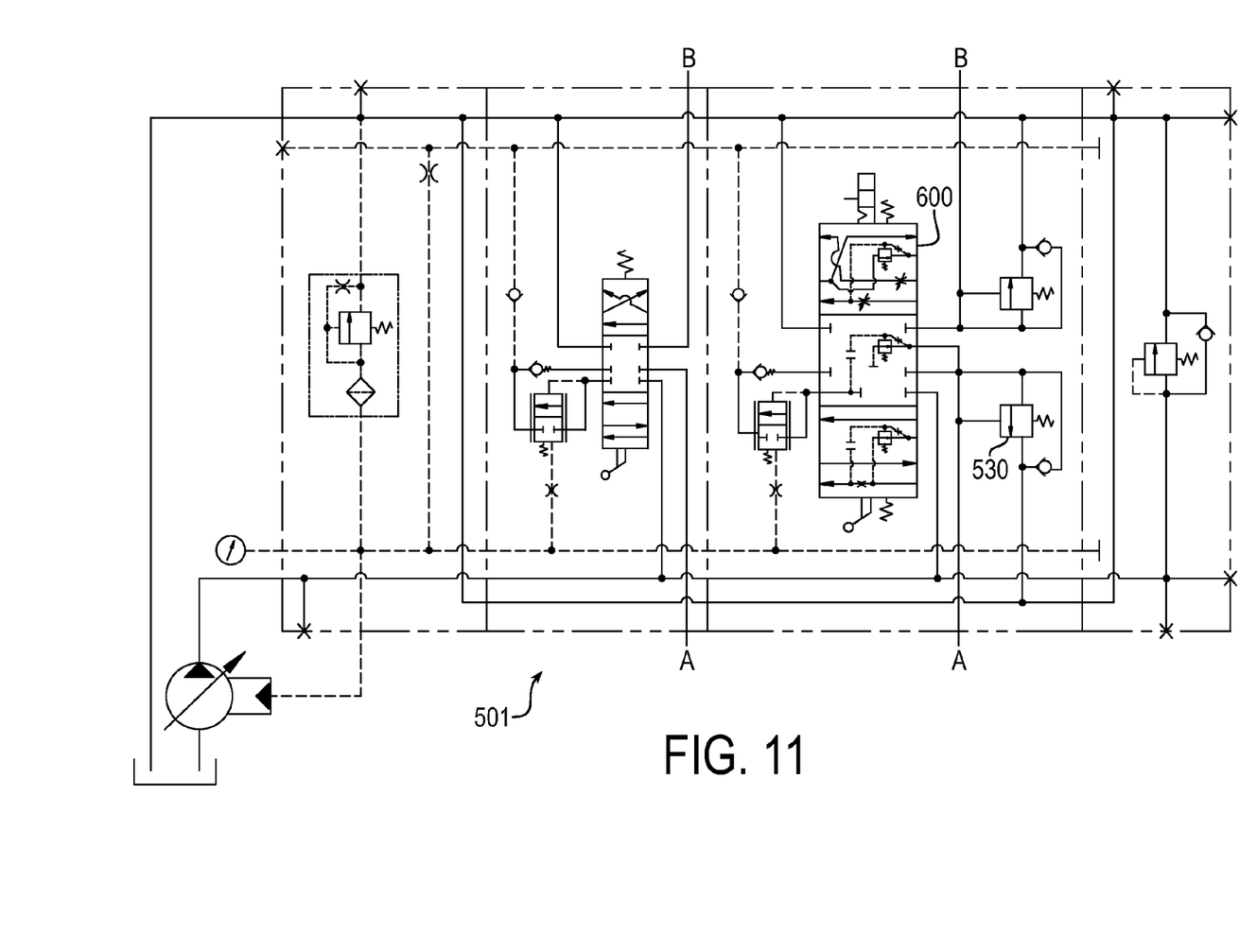
FIG. 11 shows a schematic of an exemplary manually operated PLQ PRIORITY BOOST system with PLQ PRIORITY BOOST functionality at A and standard functionality at B.
Figure 12:
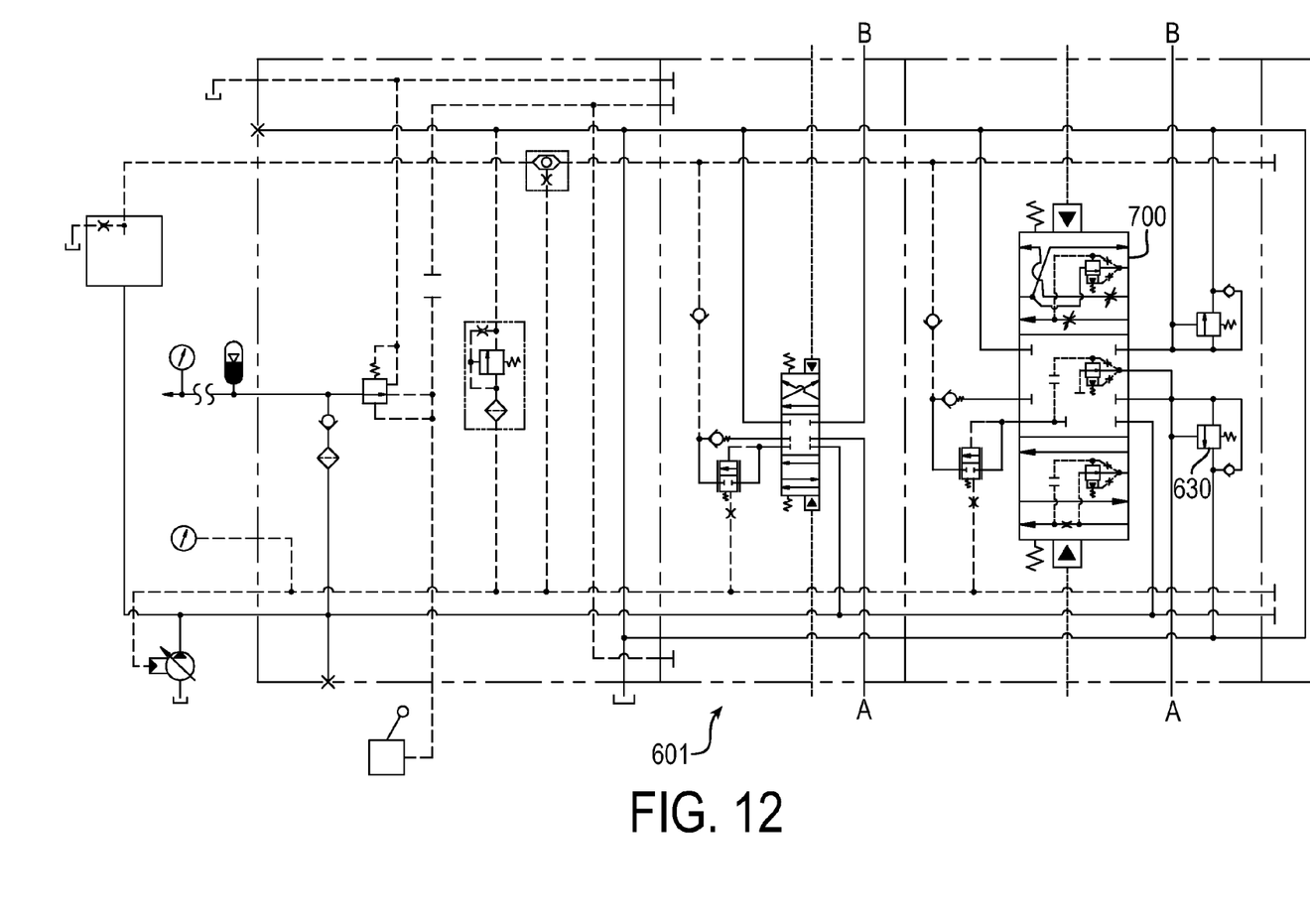
FIG. 12 shows a schematic of an exemplary hydraulic remote operated PLQ PRIORITY BOOST system with PLQ PRIORITY BOOST functionality at A and standard functionality at B.
Figure 13:
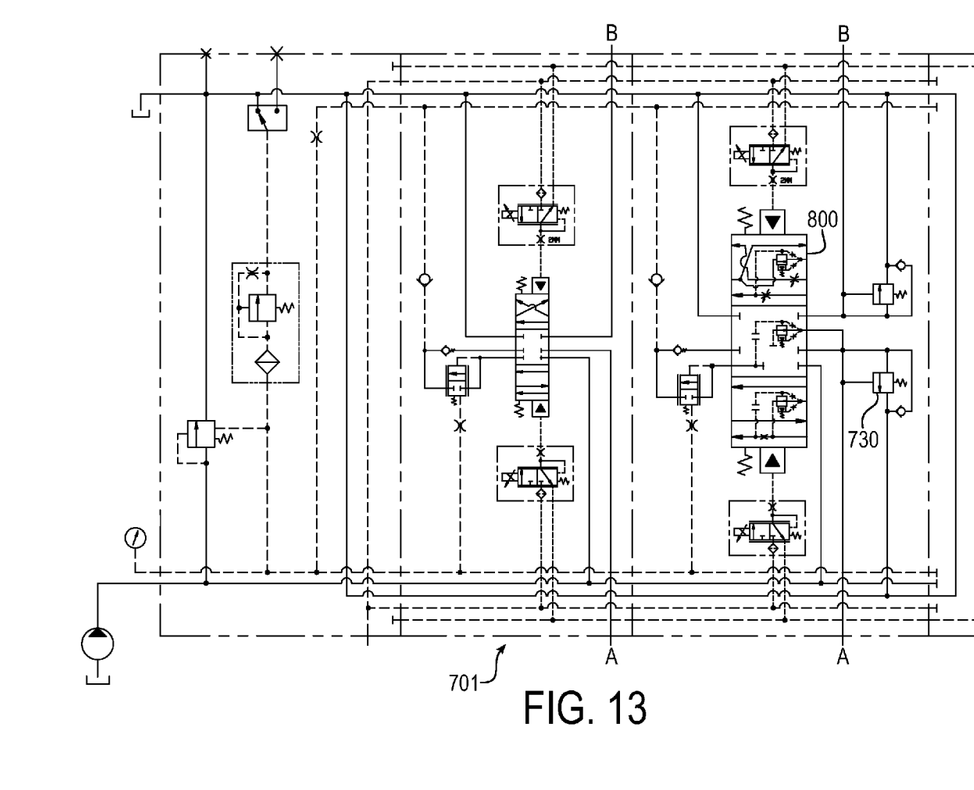
FIG. 13 shows a schematic of an exemplary electrohydraulically operated PLQ PRIORITY BOOST system with PLQ PRIORITY BOOST functionality at A and standard functionality at B.

Manual, Hydraulic, or Electrohydraulic devices can be used to actuate the control spool. See FIGS. 11, 12, and 13, respectively. The systems are substantially the same as the above-referenced system 101, and consequently the same reference numerals but indexed by 400, 500, and 600, respectively, are used to denote structures corresponding to similar structures in the system.

Figure 8:
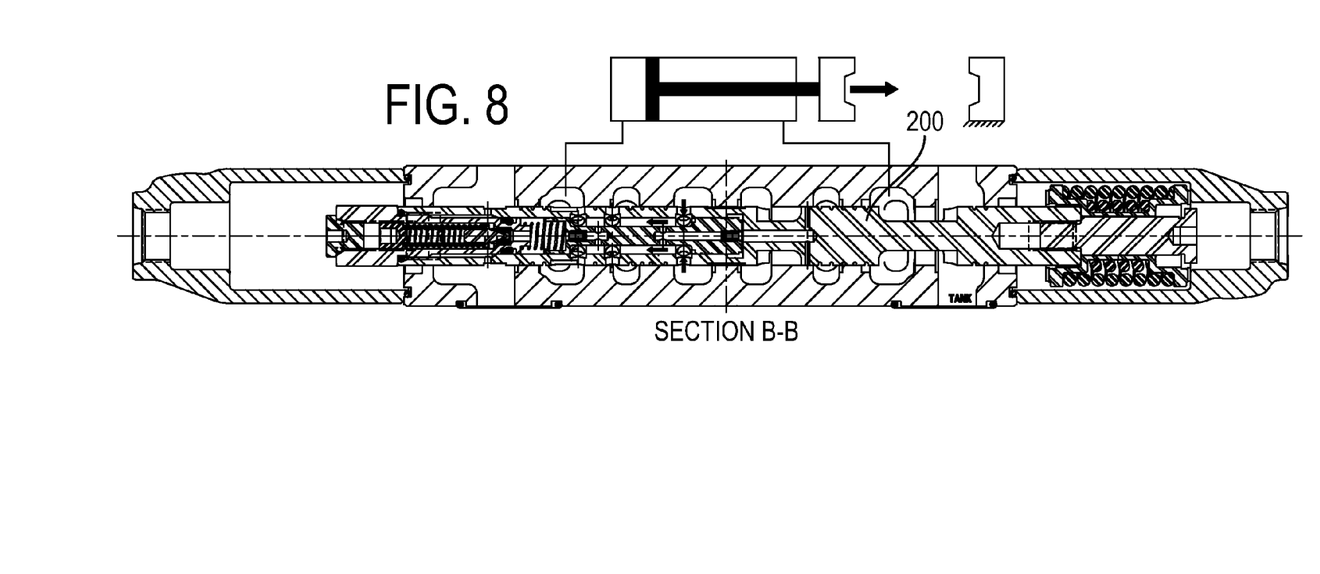
FIG. 8 shows an exemplary PLQ PRIORITY BOOST system in example operation.
Figure 9:
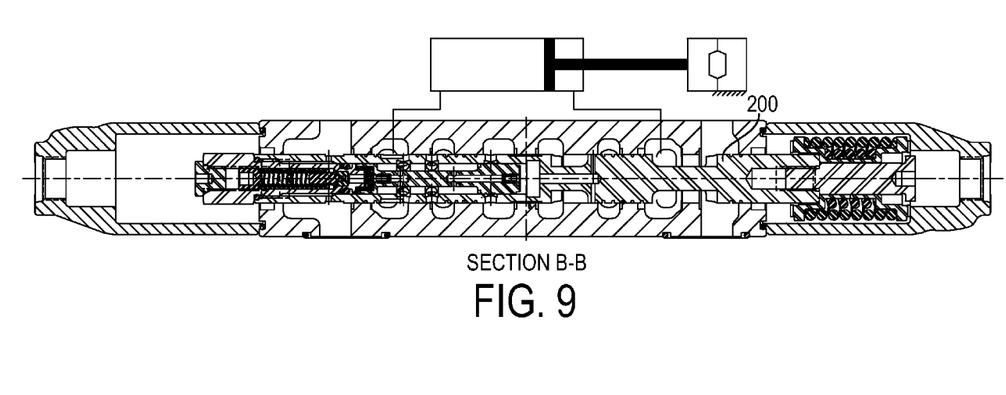
FIG. 9 shows an exemplary PLQ PRIORITY BOOST system in example operation.
Figure 10:
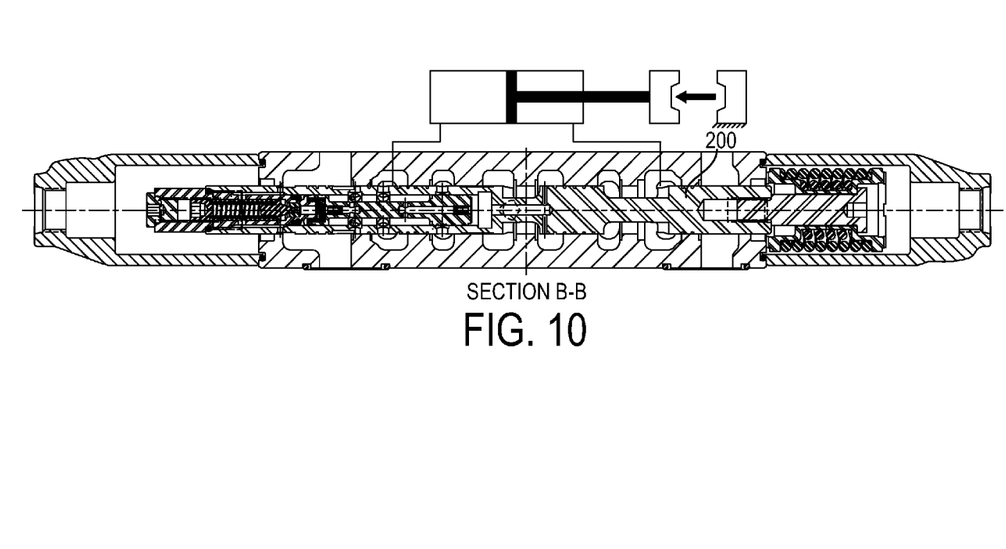
FIG. 10 shows an exemplary PLQ PRIORITY BOOST system in example operation.

In some applications, PLQ PRIORITY BOOST can be metered to output a selected inlet flow and to slow and control actuator impact at deadhead, as shown in FIGS. 8-10. Upon stalling, the actuator (e.g., hydraulic cylinder or motor), the reduced pilot flow pressure limitation controls the applied force or torque. Then the control spool can be advanced fully into detent (mechanical, hydraulic pressure, or electromagnetic) for sustained pressure limitation and operator freedom to control other machine functions. The energy conserving and negligible pilot flow consumption lets essentially 100% pump flow be used by other functions in the system.

Figure 15:
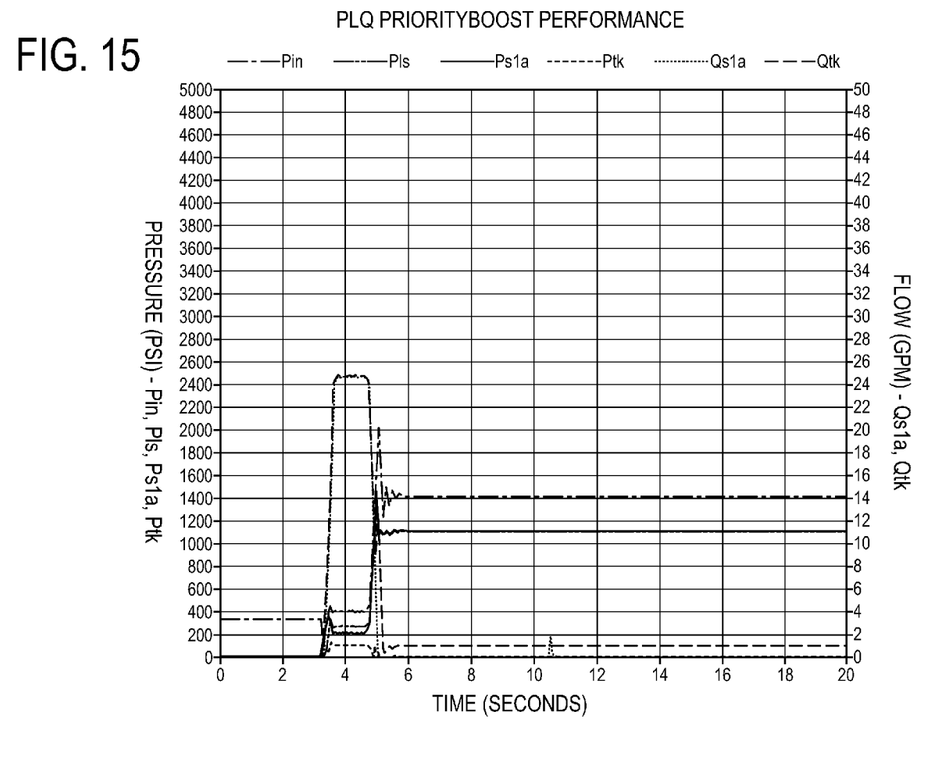
FIG. 15 shows a PLQ PRIORITY BOOST performance graph depicting sudden actuation of PLQ PRIORITY BOOST Worksection where an actuator rapidly advances to a stalled state.
Figure 16:
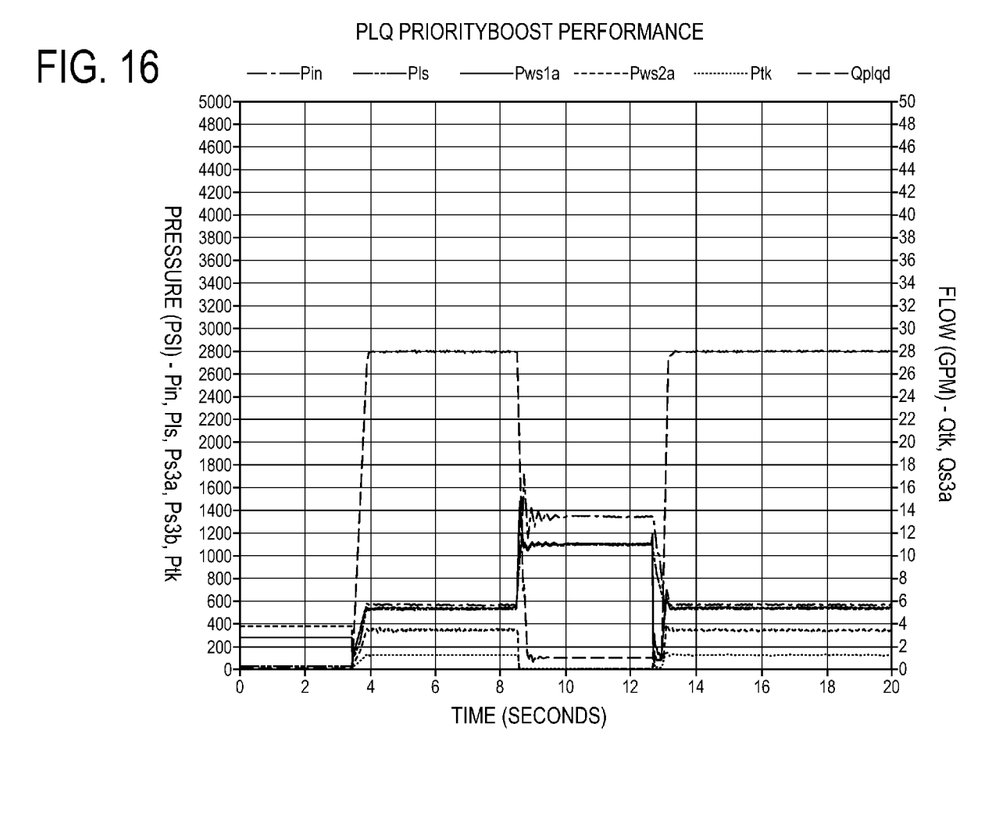
FIG. 16 shows a PLQ PRIORITY BOOST performance graph depicting sudden actuation of PLQ PRIORITY BOOST Worksection where an actuator rapidly advances to a stalled state and then the actuator un-stalls and PLQ PRIORITY BOOST flow resumes.

In other applications, PLQ PRIORITY BOOST may be suddenly and fully actuated from neutral into detent. The actuator will advance based on the selected Inlet (Boost) Flow and the workport will be pressure limited upon achieving the pressure setting. Pilot flow is the worksection flow demand when the actuator is stalled. FIGS. 15 and 16 are similar except that, in FIG. 16, the actuator becomes unstalled whereby the load pressure appreciably decreases and the workport outputs inlet flow again.

Exemplary PLQ PRIORITY BOOST control spools may carry an inner boost spool 250 that controls flow from the inlet (pump supply) to workport "A" by sensing the "A" pressure. It can open fully to supply a maximum flow, completely close based on a boost pressure setting (e.g., about 100-200 psi) below the final workport pressure limitation setting, and meter a partial inlet flow amount upon approaching the boost flow pressure setting or departing from it.

Figure 14:
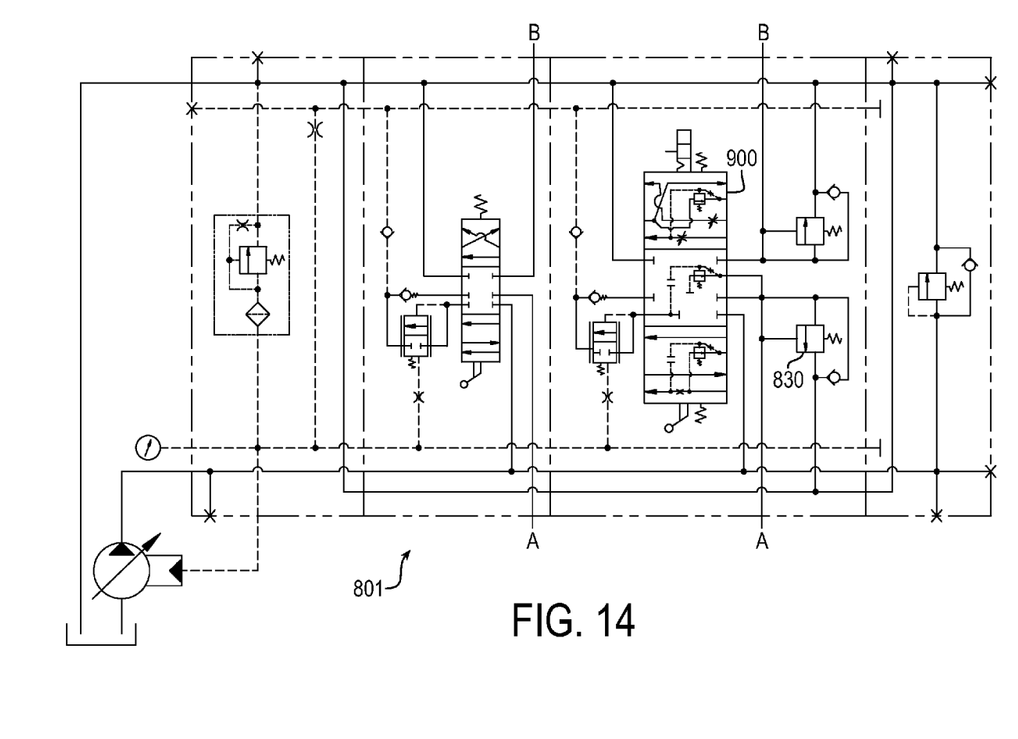
FIG. 14 shows another schematic of an exemplary manually operated PLQ PRIORITY BOOST system with PLQ PRIORITY BOOST functionality at A and standard functionality at B.

The boost pressure setting control device can be direct acting (See FIG. 14) per spring resistance or pilot operated (See FIG. 11) consisting of a bias spring plus a pilot relief valve.

Deadhead meter notches demand a reduced pilot flow when inlet flow demand starts and are engaged for the remainder of stroke. Pilot flow to the workport creates the worksection's load sense (LS) signal and is available for the pilot flow workport pressure limitation mode. Flow sharing post pressure compensator and workport RV designs may be able to acceptably compensate and pressure limit the low pilot flow, respectively. Workport RV also provides shock pressure protection. Pilot flow pressure limitation is controlled by the workport RV by exhausting a partial or all the pilot flow to tank. For partial flow, the remaining flow will go to the actuator. Flow to the actuator will increase as the workport pressure reduces as a function of the workport RV pressure override characteristic. Pilot flow pressure limitation can also be solely controlled by the pilot relief valve 270.

When the control spool is actuated into HP"A" position, initially the deadhead meter notches engage. Next, the inlet flow metering area starts, and the boost spool outputs flow to workport A depending on the inlet flow area magnitude, the "load sense flow+margin pressure source" margin pressure setting, and the workport A pressure.

The boost spool will be fully open if the workport A pressure is less than boost flow pressure setting of, for example, 100-200 psi below the final workport pressure limitation setting. There will be a small pressure range that the boost spool will meter flow to workport A due to the boost control device pressure override characteristic.

The small pressure range extends from the start of boost spool movement to full stroke. It depends on the "direct acting" resistance spring force gradient or "pilot operated" bias spring force gradient that creates a force/pressure differential for the spool stroke range.

Tank fluid/pressure floods the spring end of the direct acting type. Workport A pressure minus the pressure drop through the control spool inner chamber acts on the opposite boost spool end and must overcome the spring and tank pressures.

Tank fluid/pressure floods the spring end of the pilot operated relief valve (RV) 250. There is an orifice 255 in the boost spool bias spring end that feeds the pilot RV. The pilot RV senses the bias spring cavity 222 pressure which is workport A pressure minus the pressure drop thru the control spool inner chamber minus pressure drop across the orifice. That pressure must overcome the pilot RV spring and tank pressures to operate the RV.

Workport A pressure minus the pressure drop thru the control spool inner chamber 210 acts on the opposite boost spool end and must overcome the bias spring cavity pressure to close the boost spool. Pressure differential between the boost spool ends causes it to begin to shift. The boost spool fully shifts with increased pressure differential.

As the actuator begins to stall, workport pressure escalates to the boost pressure setting which motivates the boost spool to stroke fully and meter inlet (boost) flow down so workport flow output equals pilot flow.

Pressure continues to escalate, pilot flow feeds workport A, and the workport RV pressure setting is eclipsed. Then a portion of the pilot flow will be exhausted by the workport RV further slowing the actuator. When the actuator is completely stalled per increased workport A pressure, the pilot flow will be exhausted by the workport RV and pilot RV if "pilot operated" whereby the final workport pressure limitation setting is achieved. Or, the pilot relief valve 270 can solely exhaust the pilot flow and control final workport pressure. The actuator is automatically decelerated and cushioned during this process.

When HP"B" position is selected, the boost spool's spring biased position connects the feed passage to workport A. Normally the boost spool is immediately signaled to fully shift since qmet pressure exceeds workport A pressure to disconnect feed from workport A. If workport A is supporting a load in a meterout condition, then A pressure may exceed qmet pressure whereby the boost spool will stay spring biased. The actuator exhaust flow into workport A would then be metered to tank.

Also, a small signal flow from workport A may flow to qmet via the boost spool signal orifice. Initially that signal flow will combine with normal Inlet to Qmet metered flow to saturate the system load sense vent orifice and flow to workport B via the feed passage. As the control spool is stroked, workport A connects to feed via the boost spool. A portion of the actuator exhaust flow into workport A that is metered to Tank will be metered to the feed passage. That feed passage flow will be joined with normal Inlet to Qmet flow to supply workport B and the other actuator side. The event timing and flow areas can be customized for a particular application to yield a desired result.

An application that requires a constant force or torque when the machine actuator reaches a stalled position can use PLQ PRIORITY BOOST. For example, a snow plow salt spreader truck (Plow Blade Elevation), which may use regulated pressure to generate upward force to counter gravity acting on the blade in order to maintain elevation. Further, a snow plow salt spreader truck (Scraping with Plow) may use regulated pressure to control the force of the plow blade against the ground. Still further, forestry skidder, loader, feller, buncher machines (Clamping and Retaining Logs) may use regulated pressure to control the clamping force of the tongs against the logs or trees while they are being moved. Moreover, stamping, molding machines (Maximum Press) may use regulated pressure to control the force of a ram against the part being made. Additionally, a construction excavator (Swing) may require rapid rotational acceleration which can be controlled by limiting torque on a rotary motor. Further, impact sensitive and/or automated applications may include a machine actuator that could be accelerated to reduce transition time with PLQ PRIORITY BOOST Inlet flow. Then the actuator can be decelerated by metering PLQ PRIORITY BOOST to its pilot flow stage to reduce impact and provide reduced pilot flow pressure limitation when stalling the actuator. A computer program via a controller could manage this process if the PLQ PRIORITY BOOST worksection is configured with standard hydraulic remote (HR) or electrohydraulic (EH) spool positioners. Still further, with PLQ PRIORITY BOOST the "Inlet (Boost) Flow" is extracted directly from the pump supply passage to give priority over other worksections in parallel with the Priority Boost worksection. For example, a function can be rapidly advanced, and clamped with sustained pressure limitation. Then the operator has immediate freedom to control other machine functions.

The PLQ PRIORITY BOOST as described herein completes the work task immediately so that other functions can then work without any flow sharing effect from the Priority Boost worksection. Further, a customer selected control spool "Inlet Flow" will be the workport output higher flow as the actuator (cylinder) extends from a Retracted to a Stalled state. Any time the pressure setting is achieved or when the actuator is stalled, the control spool demands only a reduced (e.g., 0.9 gpm) Pilot Flow for pressure limitation. Workport output flow will automatically increase if workport pressure is less than the pressure setting. The selected Inlet Flow value can be, for example, 4-32 gpm. Still further, the "Inlet (Boost) Flow" is extracted directly from the pump supply passage to give priority over other worksections in parallel with the Priority Boost worksection. For example, a function can be rapidly advanced, and clamped. Moreover, the control spool can be advanced fully into detent (mechanical, hydraulic pressure, or electromagnetic) for sustained pressure limitation and operator freedom to control other machine functions. The energy conserving and negligible 0.9 gpm consumption lets essentially 100% pump flow be used by other functions in the system. Additionally, as the actuator begins to stall, workport pressure escalates to the boost pressure setting which motivates the boost spool to stroke and meter Inlet (boost) Flow down so workport flow output equals Pilot Flow. Then a portion of the Pilot Flow will be exhausted by the workport RV further slowing the actuator. When the actuator is completely stalled per increased workport A pressure, the Pilot Flow will be exhausted by the workport RV and the final workport pressure limitation setting is achieved. The actuator is automatically decelerated and cushioned during this process. The pilot relief valve 270 can be solely used to control the final workport pressure. Further, adjustable Workport A Pressure Settings are Easily Achieved. Still further, a standard Workport Relief Valve (RV) is used to Limit Workport Pressure using a small Pilot Flow. It also provides Workport Shock Suppression in Addition to its Pilot Flow Pressure Limitation Function. Moreover, a Standard Low Cost Pressure Compensator can be used. Additionally, response to Limit Workport Pressure is Fast since the pressure compensator is Not Pilot Operated and the Workport RV is Direct Acting type. Finally, it Works with Both of the Common Flow Sharing Post Pressure Compensator Types: a) "a compensator with isolated pressure signal end chambers" and b) "a compensator with an isolated LS pressure signal end chamber and a non-isolated pressure signal end exposed to inlet metered flow."

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure limited flow priority boost valve comprising:
    an inlet chamber;
    a metering chamber;
    a spool bore fluidly connected between the inlet chamber and the metering chamber;
    a feed chamber opening to two longitudinally spaced locations of the spool bore;
    a compensator that fluidly couples the metering chamber to the feed chamber;
    a first workport chamber that fluidly couples a first workport to the spool bore; and
    a spool disposed in the spool bore and moveable from a neutral position to a first workport position,
    wherein the spool includes:
    an outer spool body having a first longitudinal side and a second longitudinal side, the first longitudinal side having a longitudinal bore and at least one radial bore in fluid communication with the longitudinal bore;
    an inner spool body disposed in the longitudinal bore and axially movable with respect to the outer spool body, the inner spool body being biased toward the second side, wherein a metering chamber bypass is formed in the longitudinal bore of the outer spool body between an exterior peripheral surface of the inner spool body and an interior peripheral surface of the outer spool body, the inner spool body including at least one longitudinal bore and at least one radial bore in fluid communication with the longitudinal bore of the inner spool body and the radial bore of the outer spool body,
    wherein, when the spool is in the neutral position, the metering chamber bypass is blocked and the inlet chamber is disconnected from the metering chamber, the feed chamber, and the first workport chamber, and
    wherein, when the spool is in the first workport position, (i) the inlet is fluidly connected to the metering chamber via a first fluid passageway, and the metering chamber bypass forms a second fluid passageway that fluidly connects the inlet to the workport chamber while bypassing the metering chamber and the compensator if a pressure at the workport chamber is below a predetermined value, and (ii) the inlet is disconnected from the workport chamber via the metering chamber bypass if the pressure at the workport chamber is above a predetermined value.

2. The pressure limited flow priority boost valve of claim 1, wherein the first fluid passageway accommodates a reduced pilot flow between the inlet chamber and the metering chamber.

3. The pressure limited flow priority boost valve of claim 1, wherein, when the spool is in the first workport position, the inlet is fluidly connected to the metering chamber via one or more notches.

4. The pressure limited flow priority boost valve of claim 1, further comprising a second workport chamber,
wherein the spool is moveable from a neutral position to a second workport position, and
wherein when the spool is in the second workport position, the inlet is fluidly connected to the metering chamber via one or more maximum flow recesses.

5. The pressure limited flow priority boost valve of claim 1, wherein the second fluid passageway which bypasses the metering chamber accommodates a greater flow than the first fluid passageway between the inlet chamber and the metering chamber.

6. The pressure limited flow priority boost valve of claim 1, wherein the spool includes a pilot relief valve disposed at a first end of the outer spool body and in fluid communication with the longitudinal bore of the outer spool body.

7. The pressure limited flow priority boost valve of claim 1, wherein the outer spool body includes deadhead meter notches on a radially outward and longitudinally central portion for providing a load sense signal and a reduced pilot flow.

8. A hydraulic valve assembly comprising:
the pressure limited flow priority boost valve of claim 7;
an inlet;
an outlet;
the spool of the pressure limited flow priority boost valve disposed between the inlet and the outlet; and
the compensator of the pressure limited flow priority boost valve disposed downstream of the deadhead meter notches.

9. A hydraulic valve assembly comprising:
an inlet;
an outlet;
a pressure compensator downstream of the inlet; and
a pressure limited flow priority boost valve spool movable between a neutral position and a working position and comprising an outer spool body and an inner spool body,
wherein the outer spool body includes deadhead meter notches disposed such that, in the neutral position, the pressure limited flow priority boost valve spool closes fluid communication between the inlet and the pressure compensator, and such that, in the working position, the pressure limited flow priority boost valve spool opens a first fluid passageway to allow fluid communication between the inlet and the pressure compensator, and
wherein, in the working position, the inner spool body is movable relative to the outer spool body and is configured to form a second fluid passageway between the inlet and the outlet that bypasses the pressure compensator when a pressure at the outlet is below a predetermined value, wherein the second fluid passageway is blocked when the pressure limited flow priority boost valve spool is in the neutral position.

10. The hydraulic valve assembly of claim 9 comprising:
the pressure limited flow priority boost valve spool disposed between the inlet and the outlet; and
the pressure compensator being disposed downstream of the deadhead meter notches.

11. A pressure limited flow priority boost valve spool comprising:
an outer spool body having a first longitudinal side and a second longitudinal side, the first longitudinal side having a longitudinal bore and at least one radial bore in fluid communication with the longitudinal bore; and
an inner spool body disposed in the longitudinal bore and axially movable with respect to the outer spool body, the inner spool body being biased toward the second side, wherein a metering chamber bypass is formed in the longitudinal bore of the outer spool body between an exterior peripheral surface of the inner spool body and an interior peripheral surface of the outer spool body, the inner spool body including at least one longitudinal bore and at least one radial bore in fluid communication with the longitudinal bore of the inner spool body and the radial bore of the outer spool body,
wherein the outer spool body includes deadhead meter notches on a radially outward and longitudinally central portion for providing a load sense signal and a reduced pilot flow,
wherein when the outer spool body is in a neutral position, the metering chamber bypass is blocked, and
wherein when the outer spool body is shifted from the neutral position, the inner spool body is movable relative to the outer spool body to allow the metering chamber bypass to open fluid communication between an inlet and an outlet so as to bypass a compensator disposed downstream from the inlet when a pressure at the outlet is below a predetermined value.

12. The valve spool of claim 11, further comprising:
a pilot relief valve disposed at a first end of the outer spool body and in fluid communication with the longitudinal bore of the outer spool body.

13. The valve spool of claim 11, wherein the inner valve spool is configured to provide a priority boost flow when the pressure at the outlet is below the predetermined value.

14. The valve spool of claim 11, wherein the outer spool body includes one or more maximum flow recesses on the longitudinally central portion,
wherein the deadhead meter notches are longitudinally spaced from the recesses towards the first longitudinal side.

15. A hydraulic valve assembly comprising:
the pressure limited flow priority boost valve of claim 11;
an inlet;
an outlet;
the pressure limited flow priority boost valve spool disposed between the inlet and the outlet; and
the compensator being disposed downstream of the deadhead meter notches.

* * * * *